Aug. 15, 1944. W. N. ALLYN 2,355,841
OPHTHALMOSCOPE
Filed Feb. 14, 1942 2 Sheets-Sheet 1
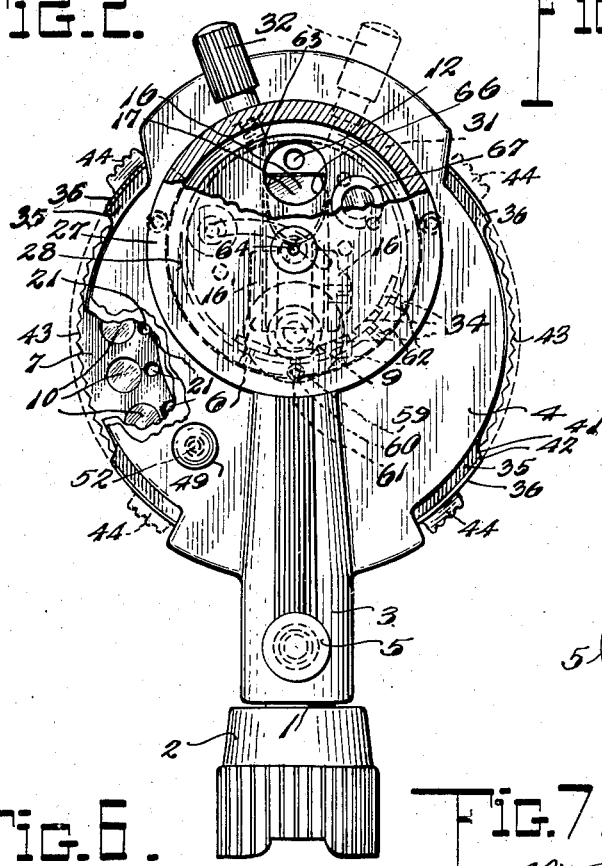
INVENTOR
W. N. Allyn
Attorneys

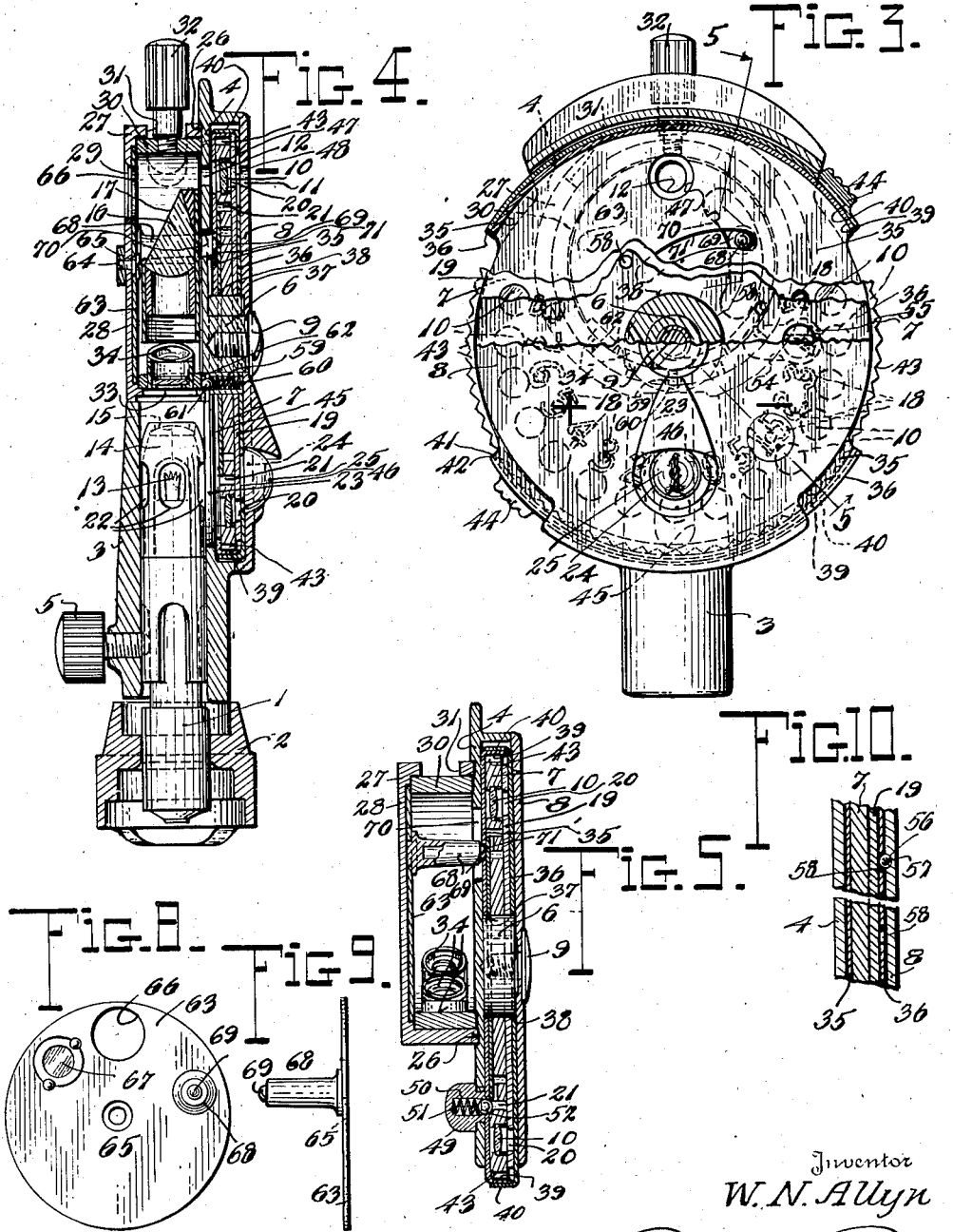

Patented Aug. 15, 1944

2,355,841

UNITED STATES PATENT OFFICE 2,355,841

OPHTHALMOSCOPE

William N. Allyn, Skaneateles, N. Y.

Application February 14, 1942, Serial No. 430,973

17 Claims. (Cl. 88—22)

This invention appertains to ophthalmoscopes, retinoscopes, and the like, and more particularly to instruments of this character wherein provision is made for protecting the same against accumulations of dust, dirt and other foreign matter, when not in use.

Most ophthalmoscopes in present day use are of the type which include a rotary lens carrier having a plurality of lenses of various dioptrics mounted therein for selective use in examining the eye. The instrument may not, or more frequently may, be provided with an illuminating and optical system which serves to project a small beam of light into the eye of the subject under examination to illuminate the field under observation through the aforementioned selective lenses. A typical instrument of this character, and which is in rather extensive use, is disclosed in my prior Patent #2,027,663, granted January 14, 1936. Another form of this instrument is disclosed in my co-pending joint application with William G. Allyn, Serial #375,344, filed January 21, 1941, now Patent No. 2,311,503. In this latter instrument, provision is made for modifying the light beam through the aid of instrumentalities mounted upon an auxiliary rotary carrier for selective interposition in the light beam.

Both the light modifying instrumentalities and the lenses above referred to are of relatively small size, and are quite inaccessible from the exterior of the ophthalmoscope, once assembled, should removal of dust and other accumulations therefrom become desirable or necessary, as is oftentimes required because of the fact that even slight accumulations of dust impair the effective use of the instrument. Disassembly of the instrument by the ordinary users thereof, for purposes of cleaning the same is quite impractical because of the danger of misadjustment of the parts on reassembly, and/or damage or breakage of the parts, some of which are rather delicate. Accordingly, cleaning of the instrument can best be accomplished by the manufacturer or others skilled in servicing the same, but since this would entail expense, and particularly, periodical loss of use of the instrument attendant thereto, the users more frequently try to do without cleaning the instrument, with consequent loss of efficiency and grave danger of error in diagnosis of eye conditions.

Thus it will be seen that a particular and highly important problem is presented by instruments of this character, which, so far as I am aware has not been satisfactorily solved prior to the development by me of the present invention, which fully and practically satisfies the long felt need for a dust proof ophthalmoscope.

The primary object of my invention is to provide an adjustable shutter means for ophthalmoscopes and the like, which shutter means in one position of its adjustment effectively excludes or prevents the accumulation of dust, dirt and other foreign matter upon the lenses and/or other elements of the usual optical and illuminating systems which are parts of the ophthalmoscope, and in another position of its adjustment, conditions the instrument for use in the usual manner, without interfering with the user's view or with the light rays. In those types of instruments having both a set of selective lenses and separate light modifying means respectively carried by separate carriers, a plurality of shutters may be employed for cooperation therewith, said shutters being preferably adjustable by a common controlling instrumentality conveniently accessible at the exterior of the instrument.

Another object of the invention is the provision, in an ophthalmological instrument, of shutter means having the special form of a dust-proof or protective case or housing extending about and substantially completely enclosing the main rotary lens carrier, said case or housing being rotatable relative to the lens carrier, and the opposite walls of the case having aligned apertures therein with which the lenses may be selectively registered when the shutter means is brought to a position permitting the conventional use of the instrument, while the case or housing, in another position of its rotative adjustment, serves to close the usual sight opening provided in the frame of the instrument upon which the rotary lens carrier is customarily mounted.

Other and further objects of the invention will be hereinafter described, and the novel features thereof defined by the appended claims.

In the drawings:

Figure 1 is a view in side elevation of a typical ophthalmoscope head having my invention embodied therein;

Figure 2 is a view of the ophthalmoscope head of Figure 1 as seen in rear elevation, certain of the parts being broken away and shown in section;

Figure 3 is a view in front elevation, as seen from the observer's side of the ophthalmoscope, certain of the parts of the ophthalmoscope head being omitted, and other parts being broken away and shown in section;

Figure 4 is a vertical sectional view taken through the vertical center of the instrument, certain of the parts being shown in elevation;

Figure 5 is a sectional view taken on the line 5—5 of Figure 3;

Figure 6 is a view in elevation of one of the complemental parts of the shutter means which is associated with the main lens carrier;

Figure 7 is a view in elevation of another complemental shutter means, generally similar to Figure 6;

Figure 8 is a view in elevation of the shutter means which is associated with the carrier and housing for the light modifying instrumentalities;

Figure 9 is a view in side elevation of the shutter means shown in Figure 8; and Figure 10 is a fragmentary detail sectional view taken through the ophthalmoscope head in the plane of the detent means which serves to yieldably restrain the shutter means associated with the main lens carrier, against movement when adjusted to its operative and inoperative positions respectively.

Like reference characters designate corresponding parts in the several figures of the drawings, wherein 1 denotes a lamp supporting spindle having a coupling 2 affixed to its lower end for attachment of the same to a battery handle (not shown) or to some other suitable source of electric supply, the details of which are immaterial to the present invention. Enclosing the spindle 1 is an elongated, generally tubular housing 3, and attached to the upper portion of the housing 3, or formed integrally therewith, if preferred, is a generally circular supporting plate 4, this supporting plate constituting a part of the frame of the ophthalmoscope head. The spindle 1 is axially adjustable in the tubular housing 3, and is removably attached to the latter by means of a set screw 5, as best shown in Figures 1, 2 and 4. Carried by the supporting plate 4 and extending axially therefrom at the center thereof is a boss 6 on which is rotatably mounted a main lens carrier or disc 7. At the forward side of the lens carrier 7 is disposed a front cover plate 8 which is removably attached to the central boss 6 by a screw 9 having threaded engagement with a corresponding threaded bore in the boss. The front cover plate 8, together with the supporting plate 4 from which it is axially spaced, form a substantially closed frame or housing in which the lens carrier 7 is free to rotate on the boss 6 as its bearing support.

Disposed in the lens carrier 7 adjacent to the periphery thereof, is a plurality of equally spaced lenses 10 which are selectively registerable with a sight opening 11 provided in the front cover plate 8 near the upper edge of the latter, and a corresponding aligned sight opening 12 in the supporting plate 4. Thus the sight openings 11 and 12, together constitute the sight opening through the frame of the instrument, and as the main lens carrier 7 is rotatively adjusted about its central axis, the various lenses 10 carried thereby, may be successively brought into coaxial alignment with the sight opening so that the observer may view the eye of the subject under examination through a selected lens. The lenses 10 are customarily of different dioptrics, and usually include a group of positive lenses and another group of negative lenses.

Carried by the spindle 1 and disposed within the tubular housing 3 is a small but powerful electric lamp 13 over which is positioned a ferrule 14 having mounted in its upper end a condenser lens 15. Disposed above the lamp 13, and adjustably mounted in a clamping frame 16' fixed to the back of the supporting plate 4, is a light reflecting member or prism 16 through which the light rays from the lamp 13 are projected. As the light rays pass through the prism, they are reflected by the reflecting surfaces thereof so that they emerge from the rear face 17 of the prism in a direction generally in line with the axis of the sight openings 11, 12 previously referred to, so that as the observer looks through the sight openings into the eye of the subject, the eye will be illuminated by the light beam to facilitate examination.

So much of the construction as has been just described above, forms the basis of most ophthalmoscopes which are in present day use. Some of these instruments include other adjuncts such as illuminated indices, light modifying means, and the like, which will now be briefly described.

Having in mind that the examination of the eye is usually conducted in a darkened room, it is very desirable to permit quick identification of the respective lenses as they are selectively brought into use by rotative adjustment of the main lens carrier. To facilitate such identification under darkened conditions, there may be associated with each lens 10 an index 18. According to one form of index illuminating system disclosed in my prior Patent #2,027,663 hereinbefore referred to, the indices are carried by a translucent dial 19 attached to the front side of the main lens carrier 7. The translucent dial is stamped out to provide an opening 20 in register with each lens 10 so that the dial will not interfere with the use of the lenses through which the eye is observed. The lens carrier or disc is in turn provided with a series of apertures 21 adjacent to the lenses 10, there being one aperture for each lens, and each aperture being located directly behind the corresponding index on the translucent dial. To permit illumination of the indices, the ferrule 14 which extends about the lamp 13 is slotted as at 22 so that some of the light may be directed forwardly from the lamp towards the lens carrier. The supporting plate 4 is also provided with an elongated slot 23 so that the light rays from the lamp 13 can pass through the light openings 21 in the lens carrier 7 as the lens indices are respectively brought into register with an index opening 24 provided in the front cover plate 8 at a point diametrically opposite to the sight opening 11. In other words, as each lens 10 is aligned with the sight openings 11, 12, a corresponding index is aligned with the opening 24, and the index will be illuminated by the light emitted from the lamp 13 so as to clearly present the index to view. If desired, a magnifying lens 25 may be mounted over the index opening 24 in the cover plate to facilitate reading of the illuminated indices on the translucent dial 19 as the latter are selectively presented to view during rotation of the lens carrier 7.

While I have described in the foregoing a particular type of index illuminating system, it is to be understood that the use of the same is optional, and the invention is not to be limited thereto. The same also applies to the light modifying instrumentalities which will now be described.

Referring particularly to Figures 1 to 5, it will be seen that the rear face of the supporting plate 4 is provided with an annular recess 26 in which there is seated the open end of a generally cup-shaped housing or casing 27. The peripheral wall of the housing 27 is cylindrical in form, and this housing may be attached to the supporting plate 4 in any suitable manner, but preferably by means of a plurality of minute screws (not shown) extending through the supporting plate into the rim of the housing 27. The back wall 28 of the housing is provided with an enlarged aperture 29 which is of sufficient size to permit the light beam projected rearwardly from the prism 16 to pass therethrough, and at the same time, to permit the subject to be viewed by the observer through the sight openings 11, 12, without such view being obstructed by the housing 27. Arranged within the housing 27 and free to rotate therein is an annular ring or collar 30 which constitutes an auxiliary rotary carrier for the light modifying means hereinafter described. This auxiliary carrier 30 is preferably formed so that it has a smooth working bearing fit within the housing 27, and the forward end of the auxiliary carrier seats in the groove 26 in the back of the supporting plate 4, along with the corresponding end of the housing 27, the groove 26 being made wide enough for this purpose. The peripheral wall of the housing 27 at its upper side is provided with an elongated slot 31, through which extends an operating knob or arm 32 which is affixed at its inner end to the auxiliary carrier 30, as by threaded engagement with the same. By moving the knob 32 in one direction or the other in the elongated slot 31, a rotary movement will be imparted to the auxiliary carrier 30 causing the latter to turn about its central axis which is disposed horizontally and generally parallel to the sight openings 11, 12, but with the peripheral wall of the auxiliary carrier arranged substantially transversely to the path of the light rays passing from the lamp 13 to the prism 16. As clearly shown in Figures 2 and 4, the prism 16 is disposed wholly within the housing 27 of the auxiliary carrier 30 so as to be substantially completely enclosed thereby. The lower side of the housing 27 abuts against the upper end of the tubular housing 3 which encloses the lamp. To permit the light rays from the lamp 13 to enter into the housing 27, the latter is provided at its lower side with an opening 33.

Mounted in suitable openings provided in the annular carrier 30 and arranged in equally spaced relation to each other, is a plurality of light modifying units 34 which have various controlling effects on the light rays. These units are preferably arranged in the lower half of the annular carrier 30, and each unit is inserted into its opening in the carrier with a tight press fit so as to be preferably removable therefrom should occasion require. For conventional use, one of the units 34 may be provided with a large aperture so as to permit substantially all of the light rays of the lamp to pass therethrough; another unit may be provided with a small aperture to reduce the light; still another unit may be provided with a slit to control the shape of the light beam; still another unit may be provided with a color filter; and yet another unit may be provided with a light diffusing lens. The number of the units 34 may be varied according to the requirements of the user and the foregoing description has been given simply by way of example. Other units may be added or substituted, such as polaroid lenses, graticules, etc., if desired, and whatever the arrangement may be it will be understood that the rotary adjustment of the auxiliary carrier 30 will cause the light modifying instrumentalities to be selectively moved into and out of the path of the light rays at a point between the lamp 23 and prism 16.

While the prism 16 and the light modifying units 34 are enclosed within the housing 27, and the rotary lens carrier 7 with its lenses 10 is substantially enclosed within the frame of the ophthalmoscope head of which the housing 27 forms a part, the units 34, prism 16 and lenses 10 are substantially protected against injury or damage and are partially protected, at least, against accumulation of dust and other foreign matter, nevertheless it has been found that in time, dust and other matter may accumulate on these parts through entrance into the instrument through the sight openings, and more particularly the openings 11 and 29 to an extent sufficient to materially interfere with the effective use of the ophthalmoscope. Such accumulations cannot be readily removed, and hence I have now provided suitable closure means for positively excluding dust and other accumulations, according the primary object of the present invention. Such closure means preferably have the form of shutter instrumentalities which will now be described.

Referring first to Figures 6 and 7, I have shown a pair of complementary annularly flanged shutter discs 35 and 36 which may be assembled into the form of a substantially closed casing or housing for the main lens carrier 7. The shutter disc 35 is disposed in front of the supporting plate 4 and is provided at its center with an opening 37 of sufficient size to receive the central boss 6 on the supporting plate 4, this boss serving to support the shutter 35 while permitting rotative adjustment of the same about the axis of the boss. The shutter 36 is likewise provided with a central opening 38 generally similar to the opening 37, and this shutter is mounted on the boss 6 in front of the lens carrier 7. The two shutters 35 and 36 are axially spaced apart for a distance sufficient to accommodate the lens carrier 7 therebetween and to permit relative rotation between the lens carrier and both shutters. On the other hand, the shutter 35 is disposed in close proximity to the forward face of the supporting plate 4 so as to normally close the sight opening 12 in the latter to prevent the entrance of dust through this sight opening and into the chamber formed by the complementary shutters 35, 36. Similarly, the shutter 36 is arranged in close proximity to the rear face of the front cover plate 8 to normally close the sight opening 11 in the latter.

The marginal flanges 39 and 40 on the respective shutters 35 and 36 are preferably so arranged as to have telescopic engagement with each other when the shutters are assembled in the manner previously described, and these flanges are preferably interrupted as at 41 and 42 to expose the peripheral edge of the lens carrier 7 at opposite sides of the frame of the ophthalmoscope head, the peripheral edge of the lens carrier being preferably notched or serrated as at 43 to facilitate rotative adjustment of the lens carrier. One of the shutters, such as 36, is also provided with one or more operating members or finger pieces 44 extending radially from the margin thereof so as to be accessible at the side of the ophthalmoscope frame to permit rotative adjustment of the shutters relative to the lens carrier 7. It being understood that the shutters 35 and 36 are secured together at their margins by the telescopic engagement of their marginal flanges 39 and 40, it follows that both shutters 35, 36 may be rotated simultaneously through suitable manipulation of the operating member or finger piece 44 on the shutter 36 as will be obvious. In order to prevent obstruction of the light rays which are directed through the elongated slot 23 in the supporting plate 4 for illuminating the lens indices on the lens carrier 7, the shutter 35 is provided with an elongated radial slot 45 which is adapted to be aligned with the slot 23 in one position of rotative adjustment of the shutters 35 and 36. An opening 46 is also provided in the shutter 36 to permit the indices to be viewed through the magnifying lens 25 which lies over the index opening 24 in the front cover plate 8. Diametrically opposite the slot 45 in the shutter 35 and the opening 46 in the shutter 36, the respective shutters are further provided with openings 47 and 48 which are adapted to be coaxially aligned with the sight openings 11, 12 under corresponding conditions of adjustment of the shutters to permit viewing of the lens indices. Thus, in this position of adjustment of the shutters 35, 36, the shutters are inoperative insofar as their closing functions are concerned, respecting the sight openings 11, 12. By suitably rotatively adjusting the shutters to displace the openings 47, 48 relative to the sight openings 11, 12, the shutters will then assume their normal closing positions, excluding the entrance of dust, dirt, and other foreign matter through the sight openings. At the same time, the slot 45 and the opening 46 will be displaced relative to the index opening 24, although the latter is not material if this index opening is provided with a magnifying lens 25 which is seated over the opening and substantially sealed dust-tight relative thereto.

Referring now to Figure 5, it will be seen that the supporting plate 4 is provided at the rear side thereof with a projecting boss 49 having a recess 50 therein, in which recess is seated a small coil spring 51. The forward end of the spring 51 bears against a detent member which preferably has the form of a small ball 52 such as a minute steel ball commonly used for ball bearings. The ball detent 52 is adapted to coact with the lens carrier 7, and more particularly, is adapted to yieldably seat in the series of light openings 21 in the lens carrier, as these openings are selectively brought into alignment with the ball detent during the rotative adjustment of the lens carrier 7. It is to be understood of course that the diameter of the ball detent is somewhat larger than the diameter of the light openings 21 so that the detent will only seat in the rearward end of each light opening as the latter are brought into alignment therewith, and the detent cannot drop wholly into the openings. Accordingly, as each lens carried by the lens carrier 7 is selectively aligned with the sight openings 11, 12, the lens carrier will be yieldably held against inadvertent displacement by means of the spring pressed ball detent 52. The cooperation between the ball detent and lens carrier is permitted by the provision of an opening 53 in the shutter 35, which opening 53 is coaxially aligned with the ball detent 52 and each light opening 21 on rotative adjustment of the shutter 35 to its inoperative position permitting use of the ophthalmoscope. On the other hand, when the ophthalmoscope is not in use, and the shutter 35 is adjusted to its operative or closed position, the rotative movement of the shutter 35 to the latter position will automatically depress the ball detent 52 against the yieldable pressure of the spring 51, permitting the opening 53 to be displaced relative to the ball detent. At this point, it should perhaps be mentioned that the material from which the shutters 35 and 36 are made is preferably in the nature of very thin sheet metal. Thin copper having some inherent resiliency has been found to be quite satisfactory.

If desired, the shutter 35 and the shutter 36 may each have an opening 54 and 55 respectively, arranged in alignment with each other, and adapted to be aligned with the index opening 24 when the shutters assume their operative position, closing the sight openings 11, 12. In this manner, the operator or diagnostician may conveniently tell from viewing the front of the instrument, whether the lamp 13 is still illuminated after closing the shutters to their dust-excluding position.

Suitable detent means is also preferably provided for holding the shutters 35, 36 in their inoperative and operative positions, illustrated respectively by the full line and dotted lined positions of the operating member 44 in Figure 2. For this purpose, there is provided on the inner face of the front cover plate 8 a hemispherical recess 56 in which is positioned another small ball detent 57 (see Figure 10) generally corresponding to the ball detent 52. This ball detent 57 is adapted to cooperate with somewhat smaller apertures 58, 58 (see Figure 7) provided in the shutter 36 so as to be engaged by the ball detent 57 as the shutters 35, 36 are rotatively adjusted to their operative and inoperative positions respectively. In this instance, the somewhat resilient and flexible nature of the material from which the shutter 36 is made, permits the shutters to move to and from their respective positions above referred to without any yielding movement of the ball detent 57 itself. In other words, the shutter member will flex away from the ball detent sufficiently to permit the openings 58, 58 to be displaced relative to the ball detent 57.

In order to yieldably restrain the carrier 30 for the light modifying instrumentalities from inadvertent movement when selectively adjusted to interpose any one of the light modifying units in the light beam as hereinbefore described, additional detent means is provided to coact with this carrier. This detent means is best illustrated in Figures 2 and 4 wherein it will be seen that the central boss 6 is provided with an axial bore 59 near its lower edge, in which bore is disposed a coil spring 60. The forward end of the spring seats against the inner face of the front cover plate 8 when the latter has been assembled, whereas the rearward end of the spring bears against another small ball detent 61. This ball detent 61, in turn selectively engages radial notches or recesses 62 provided in the forward edge of the carrier 30, thereby producing a yieldable restraining effect upon the carrier in an obvious manner.

To close the housing 27 against the entrance of dust and other foreign matter through the opening 29 in the latter, I provide still another shutter or closure means 63 in this housing. This shutter 63 preferably has the form of a thin disc lying immediately inside of the rear wall of the housing 27 and in close proximity to the inner face thereof. The shutter is suitably connected to the housing by a screw or rivet 64 which extends through an opening 65 in the center thereof, the connection being so made as to permit free rotation of the shutter about the axis of central connection. An opening 66 is provided near the edge of the shutter 63 so that it may be coaxially aligned with the opening 29 in the rear wall of the housing 27 by rotative adjustment of the shutter 63 to one position. Displaced to one side of the opening 66 is a second opening in the shutter 63 over which is preferably mounted a transparent window 67. By adjusting the shutter 63 to bring the window 67 into coaxial alignment with the opening 29 in the housing, the observer or diagnostician can readily determine, from viewing the rear of the ophthalmoscope, whether the lamp 13 is illuminated or not, after the shutter 63 has been adjusted to close the opening 29 in the housing 27 to exclude dust and other foreign matter.

It will thus be understood from the foregoing that the shutter 63 has two principal positions of selective adjustment, one being the inoperative position in which the opening 66 is aligned with the opening 29 to permit use of the ophthalmoscope for unobstructed observance through the sight openings of the eye of the subject under examination, and the other position being the operative position, wherein the transparent window 67 is aligned with the opening 29, but the opening 29 is closed by the shutter 63 and window 67 against the entrance of dust, etc.

While the shutter 63 might be arranged to be adjusted independently of the shutter 35, 36, I prefer to inter-connect the shutter 63 with the shutters 35, 36 so that they may be all adjusted simultaneously to their respective operative and inoperative positions. For this purpose I provide on the shutter 63 a forward projecting post 68 having fixedly mounted at its free extremity a small ball 69 generally similar to one of the ball detents hereinbefore referred to. This ball 69 projects only a slight distance beyond the end of the post 68, and extends through an arcuate slot 71 provided in the supporting plate 4, as best seen in Figures 3 and 4. The slot 70 is sufficiently elongated to permit the shutter 63 to be adjusted from one extreme to the other, that is, from operative to inoperative position, and vice versa. Provided in the shutter 35 is another arcuate slot 71 into which the projecting extremity of the ball 69 on the end of the shutter post 68, is disposed. The slot 71 constitutes a camming slot, and its form and location are such that when the shutter 35 (and its interconnected shutter 36) is rotatively adjusted to its operative and inoperative positions respectively, corresponding rotative adjustment will be imparted to the shutter 63 through means of the interconnecting post 68 and protuberant ball 69. By reason of the foregoing construction a single operation may be employed to control the adjustment of all the shutters or closure members.

While the specific details have been herein shown and described, the invention is not confined thereto, as changes and alterations may be made without departing from the spirit thereof as defined by the appended claims. In this connection it is to be understood that the use of the light modifying means and its associated shutter 63 is optional, as these parts may be omitted under those circumstances where close control of the illuminating system is not required. Where so omitted, the ophthalmoscope will still retain the advantages of the closure means or shutters associated with the main lens carrier 7 which is the most vital part from which dust and other foreign matter should be excluded. Similarly, the use of the illuminated index system is optional and is not an essential part of the present invention excepting insofar as it is necessary to modify the closure means for the sight openings 11, 12 when the illuminated index system is employed.

I claim:

1. In an ophthalmoscope, a substantially circular supporting plate having a sight opening therethrough near its edge, an illuminating system mounted on the rear of said supporting plate and serving to direct a beam of light substantially in alignment with said sight opening aforesaid, a substantially circular cover plate axially spaced forwardly relative to said supporting plate and coaxially secured to the latter in such spaced relation, said cover plate also having a sight opening therethrough in alignment with the sight opening in the supporting plate, a lens disc coaxially mounted for rotation between said plates and provided with a plurality of lenses for selective registration with the aligned sight openings in said plates, and closure means coacting with the sight openings aforesaid and disposed in dust-proof contact with said plates, said closure means comprising a rotatable apertured casing disposed between the spaced supporting and cover plates and encompassing the lens disc, said casing being shiftable to and from a position closing said sight openings to exclude dust and other foreign matter from entrance through the sight openings when closing the same, and otherwise to aline the apertures of the casing with the sight openings.

2 In an ophthalmoscope, a frame having a sight opening therethrough near its edge, a lens carrier rotatably mounted in said frame and provided with a plurality of lenses which are selectively registrable with said sight opening responsive to rotative adjustment of the lens carrier, and closure means selectively adjustable to and from a dust-tight closing position relative to said sight opening, said closure means comprising a circular casing encompassing the lens carrier and rotatably mounted in the frame, said casing having a sight opening therethrough for alinement with the sight opening in the frame by rotative adjustment of the casing to a position uncovering the latter sight opening.

3. In an ophthalmoscope, a frame including spaced front and rear walls, said frame having a sight opening therethrough near its edge, a lens disc rotatably mounted in the frame between the front and rear walls aforesaid, said lens disc being provided with a plurality of lenses which are selectively registrable with the sight opening in the frame responsive to rotative adjustment of the lens disc, and closure means coacting with the sight opening in the frame and movable to and from a dust-tight position closing said sight opening, said closure means being substantially enclosed within the frame and extended to a position near the edge of the frame for access thereto in moving the closure member to and from its closed position.

4. In an ophthalmoscope, a frame including spaced front and rear walls, said frame having a sight opening therethrough near its edge, a lens disc rotatably mounted in the frame between the front and rear walls aforesaid, said lens disc being provided with a plurality of lenses which are selectively registrable with the sight opening in the frame responsive to rotative adjustment of the lens disc, and closure means coacting with the sight opening in the frame and movable to and from a dust-tight position closing said sight opening, said closure means comprising a pair of discs rotatably mounted within the frame in coaxial relation to the lens disc and at opposite sides respectively of the latter, in close proximity to the front and rear walls of the frame, and said latter pair of discs each having an aperture therethrough for alignment with the sight opening in the frame on rotative adjustment of said pair of discs to one position.

5. An ophthalmoscope as defined in claim 4, wherein the pair of discs which constitute the closure means are arranged for simultaneous rotative adjustment of the same to move their respective apertures into and out of alignment with the sight opening in the frame.

6. An ophthalmoscope as defined in claim 4, wherein the pair of discs which constitute the closure means are attached together at their marginal edges for simultaneous rotative adjustment of the same to move their respective apertures into and out of alignment with the sight opening in the frame.

7. An ophthalmoscope as defined in claim 4, wherein the pair of discs which constitute the closure means are marginally flanged for telescopic engagement of the flanges to attach the discs together for simultaneous rotative adjustment of the same to move their respective apertures into and out of alignment with the sight opening in the frame, the telescopic marginal flanges aforesaid being interrupted for a portion of the distance about the margins of the discs to expose a portion of the peripheral edge of the intermediate lens disc.

8. In an ophthalmoscope, a frame having a sight opening therethrough near its edge, a lens disc rotatably mounted in said frame and provided with a plurality of lenses for selective alignment with said sight opening responsive to rotative adjustment of the lens disc, closure means also shiftably mounted within the frame in close engagement therewith at least in the zone of the sight opening aforesaid, and selectively adjustable to and from a dust-tight closing position relative to said sight opening, and detent means coacting with said closure means for yieldably restraining said closure means against movement when in its adjusted position.

9. In an ophthalmoscope, a supporting plate having a sight opening therethrough, a lens disc rotatably mounted on one side of the supporting plate and provided with a plurality of lenses for selective alignment with the sight opening in the supporting plate responsive to rotative adjustment of the lens disc, a cover plate mounted on the supporting plate in spaced relation thereto and substantially enclosing the lens disc, said cover plate also having a sight opening therethrough aligned with the sight opening in the supporting plate, an illuminating system mounted on the opposite side of said supporting plate and including a light source and light reflecting means for projecting a beam of light generally in line with the central axis of the sight openings aforesaid, a housing mounted on the last mentioned side of said supporting plate, said housing enclosing said light reflecting means and having one opening therein to admit light from the light source to the light reflecting means, and another opening therein to permit egress of the projected light beam therefrom, said latter opening being in alignment with the sight openings in the supporting plate and cover plate, an annular member rotatably mounted in the aforementioned housing and provided with a plurality of light modifying means for selective interposition of the same in the light beam between the light source and the light reflecting means responsive to rotative adjustment of the annular member, and closure means movable to and from positions respectively closing the sight openings in the supporting plate and cover plate, and the corresponding aligned opening in the housing.

10. An ophthalmoscope as defined in claim 9, wherein the closure means comprises a plurality of adjustable shutters disposed in contiguous relation to the respective sight openings in the supporting plate and cover plate and the corresponding aligned opening in the housing.

11. An ophthalmoscope as defined in claim 9, wherein the closure means comprises a plurality of adjustable shutters disposed in contiguous relation to the respective sight openings in the supporting plate and cover plate and the corresponding aligned opening in the housing, said shutters being interconnected with each other for conjoint adjusting movement.

12. An ophthalmoscope as defined in claim 9, wherein the closure means comprises a plurality of adjustable shutters disposed in contiguous relation to the respective sight openings in the supporting plate and cover plate and the corresponding aligned opening in the housing, said shutters being interconnected with each other for conjoint adjusting movement, and one of said shutters for the sight openings in the supporting plate and cover plate being provided with an operating member accessible at the edge of the plates.

13. An ophthalmoscope as defined in claim 9, wherein the closure means comprises a plurality of adjustable shutters disposed in contiguous relation to the respective sight openings in the supporting plate and cover plate and the corresponding aligned opening in the housing, said shutters being interconnected with each other for conjoint adjusting movement, and one of said shutters being provided with an operating member accessible from the exterior of the ophthalmoscope for imparting adjusting movement to all of said shutters.

14. An ophthalmoscope as defined in claim 9, wherein the closure means comprises a plurality of adjustable shutters disposed in contiguous relation to the respective sight openings in the supporting plate and cover plate and the corresponding aligned opening in the housing, each of said shutters having an opening therein respectively adapted to register with the sight openings in the supporting plate and cover plate and corresponding aligned opening in the housing, in the open position of the shutter adjustment, and the shutter for the latter housing opening also having a transparent window therein adapted to be aligned with the housing opening in the closed position of the shutter adjustment.

15. In an ophthalmoscope, a head having a plurality of axially aligned openings therethrough, an illuminating system carried by and enclosed within the head for projecting a beam of light through one of the openings aforesaid in the line of vision through the aligned openings, an adjustable lens carrier mounted within and substantially enclosed by the head and provided with a plurality of lenses for selective alignment with the aligned openings through the head, and a plurality of shiftable closure members mounted within the head and shiftable to and from a dust-excluding position relative to the respective openings aforesaid, said closure members being interconnected for conjoint shifting movement as aforesaid, responsive to shifting of one of said closure members.

16. In an ophthalmoscope, a frame having a sight opening therethrough near its edge, a lens carrier rotatably mounted in said frame and having the form of a disc substantially enclosed by said frame and provided with a plurality of lenses which are selectively registrable with said sight opening responsive to rotative adjustment of the lens carrier, said frame being partly open at its edge to expose a portion of the lens disc about the circumferential edge of the latter to permit rotative adjustment of the lens disc, and closure means selectively adjustable to and from a dust-tight closing position relative to said sight opening, said closure means comprising a shutter rotatably mounted in said frame in coaxial relation to said lens carrier and rotatively adjustable relative to the latter, and said shutter being provided with an operating member radially extended therefrom at the open edge of the frame and adjacent to the exposed circumferential edge of the lens disc.

17. In an ophthalmoscope, a frame including spaced front and rear walls, said frame having a sight opening therethrough near its edge, a lens disc rotatably mounted in the frame between the front and rear walls aforesaid, said lens disc being provided with a plurality of lenses which are selectively registrable with the sight opening in the frame responsive to rotative adjustment of the lens disc, and closure means coacting with the sight opening in the frame and movable to and from a dust-tight position closing said sight opening, said closure means comprising a casing substantially enclosing the lens disc, with its opposite faces arranged contiguous to and between the front and rear walls of the frame so as to normally close the sight opening in the frame, said casing being rotatable relative to the lens disc and having an opening therethrough near its edge adapted to be alined with the sight opening in the frame responsive to rotative adjustment of the casing to a predetermined position, and said casing being partly open at its edge to afford access to the lens disc for rotative adjustment of the latter and having means extending therefrom at the edge of the frame for permitting rotative adjustment of the casing.

WILLIAM N. ALLYN.